Figure 3:
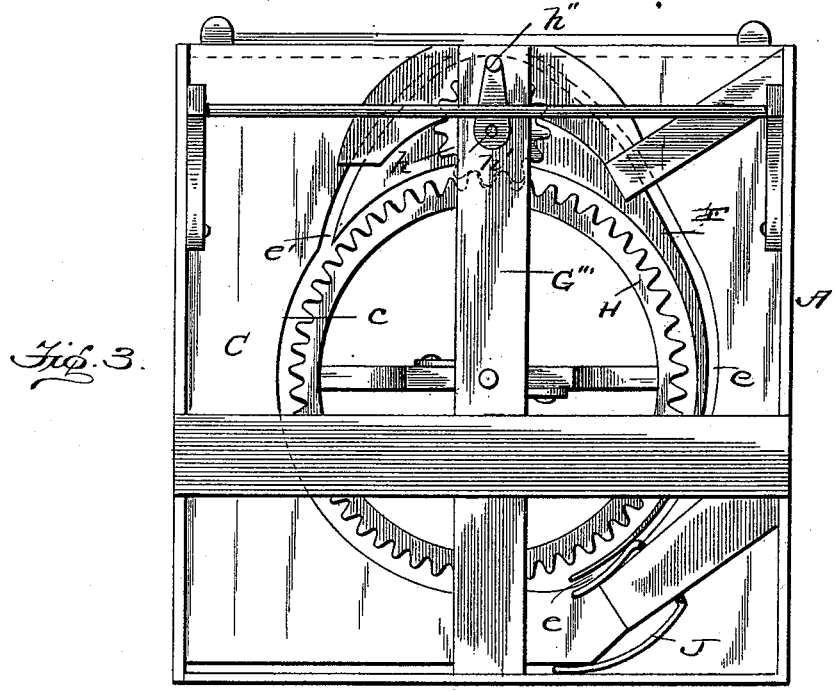

(No Model.)  4 Sheets—Sheet 1.
B. J. SMITH.
AUTOMATIC EXHIBITING DEVICE.
No. 519,484.  Patented May 8, 1894.
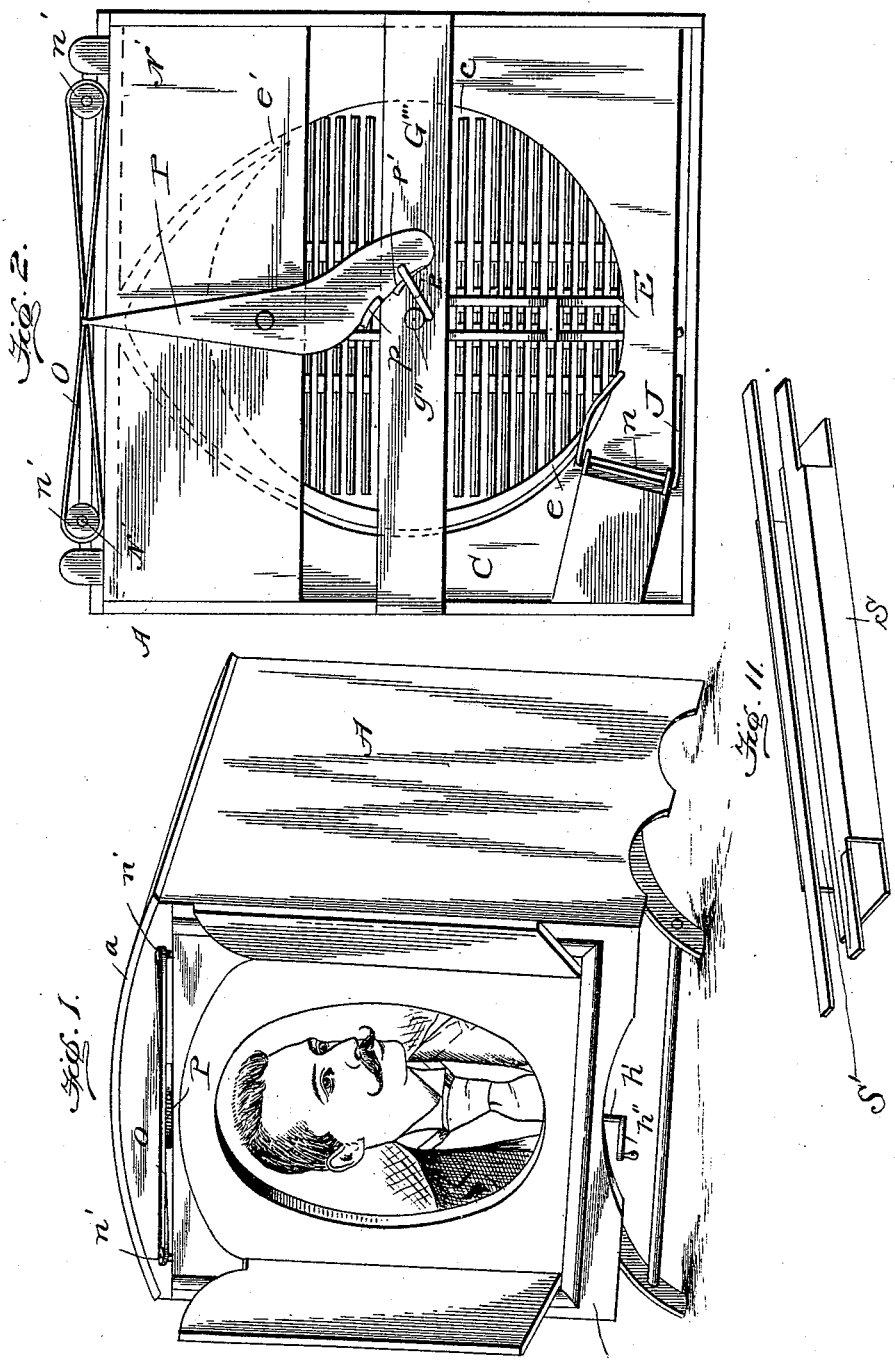

(No Model.) 4 Sheets—Sheet 2.

B. J. SMITH.
AUTOMATIC EXHIBITING DEVICE.

No. 519,484. Patented May 8, 1894.

Witnesses:

B. J. Smith.
Inventor (No Model.) 4 Sheets—Sheet 3.

B. J. SMITH.
AUTOMATIC EXHIBITING DEVICE.

No. 519,484. Patented May 8, 1894.

Witnesses:

J. B. J. Smith.
Inventor
By
Atty.

(No Model.) 4 Sheets—Sheet 4.

B. J. SMITH.
AUTOMATIC EXHIBITING DEVICE.

No. 519,484. Patented May 8, 1894.

Witnesses:

B. J. Smith

UNITED STATES PATENT OFFICE.

BENJAMIN J. SMITH, OF POTTSVILLE, PENNSYLVANIA.

AUTOMATIC EXHIBITING DEVICE.

SPECIFICATION forming part of Letters Patent No. 519,484, dated May 8, 1894.

Application filed September 23, 1893. Serial No. 486,277. (No model.)

*To all whom it may concern:*

Be it known that I, BENJAMIN J. SMITH, a citizen of the United States, residing at Pottsville, in the county of Schuylkill and State of Pennsylvania, have invented certain new and useful Improvements in Automatic Exhibiting Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

My present invention relates to improvements in automatic display cabinets of the class disclosed in a prior application for a patent filed by me on the 28th day of January, 1893, Serial No. 459,941, in which a series of objects are each successively displayed at a viewing opening, then reversed in position, and in turn brought again to the viewing opening, whereby one holder is utilized for two different views or objects and economy of space effected.

The objects of my present improvements are, first, to provide an improved form of holder by which the cards or other objects are securely grasped and held and from which they can be easily detached when occasion requires to be replaced by other cards; secondly, to provide simple and efficient mechanism for bringing the holders and their contents successively before the viewing opening; thirdly, to prevent the holders from entering the eccentric ways or paths of travel by automatic detents which are controlled by the action of the revoluble carrier that moves the holders and their contents into proper position to enter the eccentric ways when operated by hand or by power; fourthly, to insure against the holders and the cards therein being defaced by coming in contact with the door frame by the employment of a yielding arresting mechanism on the door-frame; fifthly, to provide an improved door operating mechanism which shall be automatically actuated to open the doors of the cabinet when a holder is in proper position in rear of the doors for display and in like manner be actuated to close the viewing opening when the holder is being conveyed away from the viewing opening; and finally to provide simple and efficient mechanism to the attainment of the purposes of this invention.

To enable others to understand my invention, I have illustrated the same in the accompanying drawings, forming a part of this specification, and in which—

Figure 4:
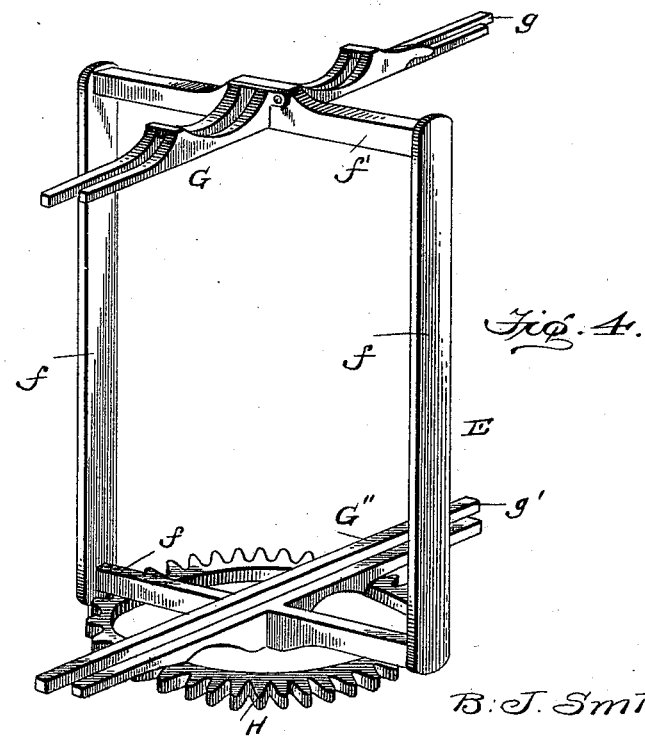
Figure 5:
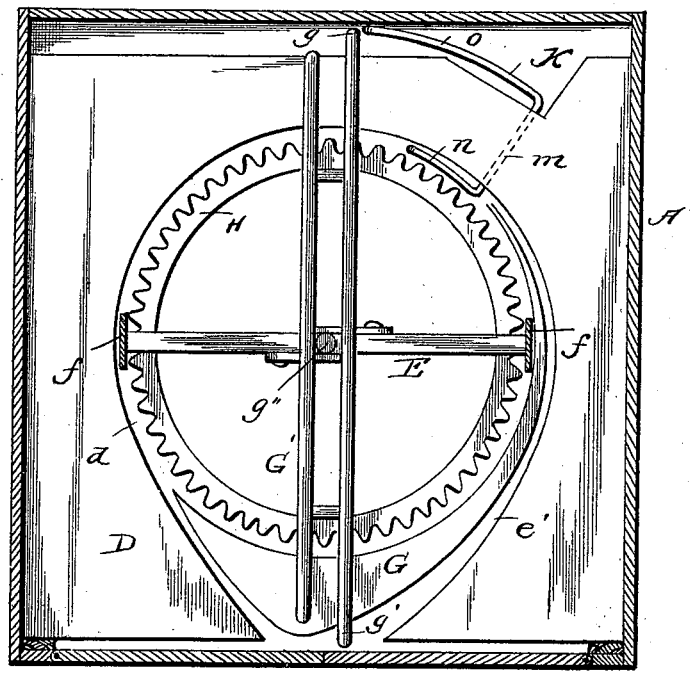
Figure 6:
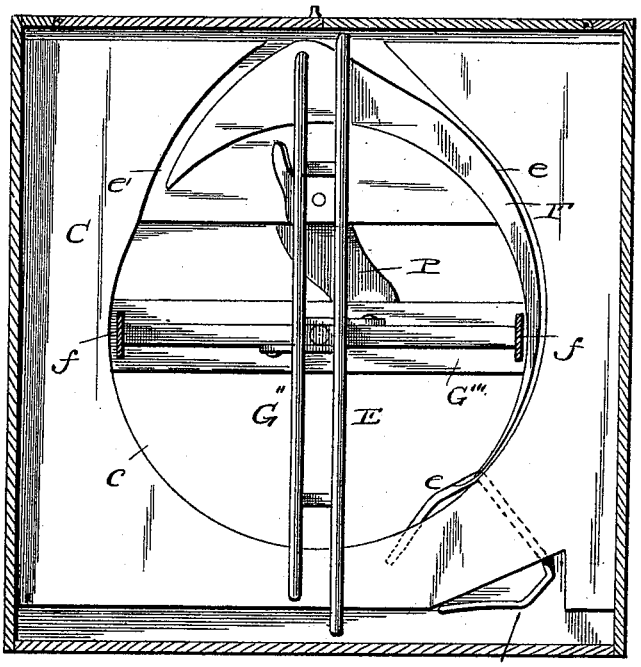
Figure 7:
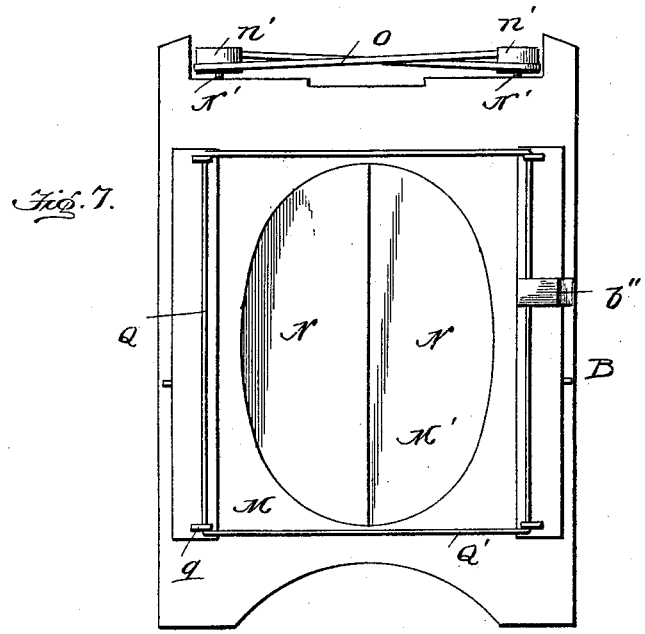
Figure 8:
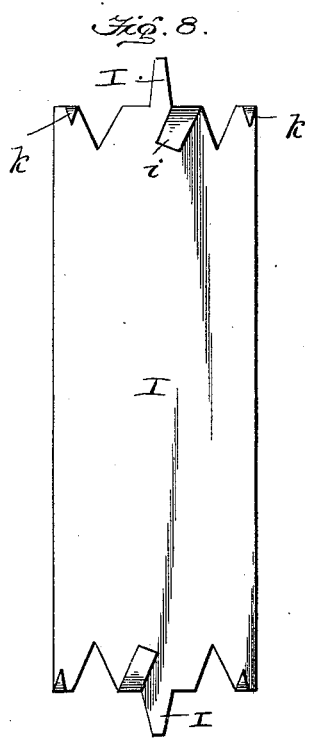
Figure 9:
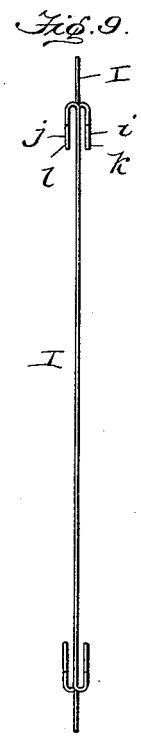
Figure 10:
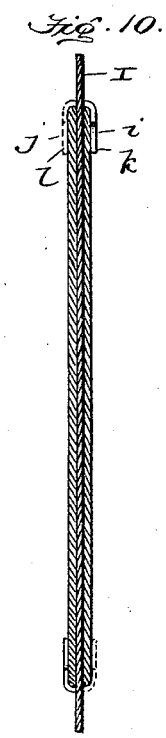

Figure 1 represents a perspective view of my cabinet with the doors thrown open and a picture displayed through the viewing opening. Fig. 2 is a top plan view of the cabinet, with the cover thereto removed, showing the mechanism for operating the doors and a number of the holders and cards therein. Fig. 3 is a bottom plan view illustrating the mechanism for operating the carrier and the lower detent. Fig. 4 is a perspective view of the carrier detached from the cabinet. Fig. 5 is a horizontal sectional view through the cabinet, looking upward, and Fig. 6 is a similar section, looking downward. Fig. 7 is a detail view, in rear elevation, of the door casing showing the yielding arresting mechanism for preventing the holders from coming in contact with the door casing and thereby obviate defacing the contents of the holders. Fig. 8 is a detail side elevation of the holder detached, and Figs. 9 and 10 are, respectively, an edge view and a sectional view of the holder shown by Fig. 8, the latter figure, 10, having two cards clamped therein, and Fig. 11 is a detail view.

Like letters of reference denote corresponding parts in all the figures of the drawings, referring to which—

A designates the inclosing casing of my cabinet within which all the holders, their contents, and the actuating mechanism for said holders are contained. The top side of this casing is closed by means of a cover, *a*, preferably detachably fastened in place, and of the arched or curved form shown by Fig. 1 to provide a space for containing the devices by which the doors are opened and closed automatically. At the front side of the cabinet a door frame B is provided. This door frame is preferably removable so that ready access can be had to the interior of the cabinet for adjusting the holders therein and for the removal of the holders when it is desired to change the cards confined therein.

C is the top plate and D is the bottom plate which are secured in the upper and lower portions of the casing A, respectively, and in these plates are provided the oval or curved openings c, d, respectively in which openings operates the revoluble carrier E, shown by Fig. 4 and within the boundaries of which are fixed the pieces or strips F, G, that form the eccentric ways for the delivery of the holders successively to the viewing opening in the door frame B. The openings in the top and bottom plates are of the peculiar form shown by Figs. 3, 5, and 6, and the pieces F, G are placed within these openings at one side thereof and in parallel positions to each other. Each piece F or G is made tapering in form, and the smaller end terminates close to one edge of its respective plate near the center of the back part of the cabinet, see Figs. 5 and 6, while the strip gradually increases in width until it reaches the front part of the cabinet, where it is widest, and then it is carried around about a fourth of the distance on the opposite edge of the opening in the plate. This strip is thus placed in eccentric position relative to the opening in the plate, and thereby forms a way or path, open at both ends, as at e, e' and forming a space between itself and one edge of the plate in which space the stud or trunnion on the holder is designed to travel as the holder is carried around in the case A with the revoluble carrier E.

From an inspection of Figs. 5 and 6 it will be noted that an open space is left, at c, d, in the top and bottom plates of the cabinet, which spaces c, d, are at the front side of the cabinet, and the widest ends of the tapered strips F, G, are made pointed or peculiarly shaped so as to project into these open spaces c, d. The way or path for the holders commences near the center of the rear side of the cabinet, then extends around one side to the front of the cabinet, and is thence carried part way around to the other side of the cabinet. The holders enter the way or path at the rear side of the cabinet and are carried along in this path to the front or open space in the way, where they are freed from the carrier and allowed to remain in position in rear of the viewing opening in the door frame while the carrier makes a complete turn and introduces another holder in the eccentric way; but previous to bringing the second holder into position in rear of the viewing opening, the first named holder is carried away in the short section of the way or path by the revoluble carrier.

The preferred embodiment of my revoluble carrier E is shown by Fig. 4 of the drawings, and it consists of the vertical open frame having the upright bars f, f, joined at the top and bottom by the horizontal cross bars f', f'. Rigid with the horizontal cross bars are the horizontal track bars G', G" which are arranged at right angles to the frame and in parallel positions to each other at the top and bottom of the frame. These track-bars are slotted throughout their length, as shown by Fig. 4, and the slots extend nearly the thickness of the bars and nearly divide the same longitudinally, but the sides thereof are joined by integral webs, presenting a substantial, simple structure. The upper track bar has its left hand side extended at one end to form the projection g, while the lower track bar G" has its right hand side extended at the opposite end forming the projection g', the function of which projections are to lift the detents across the entrances to the paths or ways in which travel the trunnions or studs on the object-holders of the cabinets, as will be hereinafter more fully described. This carrier is pivoted centrally within the casing so as to revolve therein by the trunnions g" which are preferably integral with the cross bars f', at the middle thereof; and these trunnions find bearings in the cross pieces G''' which are fixed at any desired way to the top and bottom plates, C, D, respectively, said carrier revolving within the spaces formed by the inner edge of the pieces F, G, and the inner edge of the top and bottom plates, see Figs. 3, 5 and 6.

The carrier may be rotated either by hand or by power mechanism, and in the drawings I have shown one means for rotating the carrier by hand, which means consists of a large gear wheel H which is fast to the lower trunnion of the carrier, and with this gear H meshes a driving gear h carried by a shaft h' which has bearings in the lower bar G''' and is provided with a crank h" by which it can be turned; but I would have it understood that I do not strictly confine myself to this specific means for revolving the carrier as it is evident that a skilled mechanic can supply equivalent means for this purpose.

In my cabinet I employ a large number of holders, see Fig. 2, of the form shown by Figs. 8 to 10 inclusive. The holder consists of a vertical plate I which is stamped or cut from a single piece of sheet metal of the proper length and width. At each end, the holder I is provided with two lips i, j, which are near the middle thereof and which are bent or turned in opposite directions, and each holder is further furnished, at each end thereof, with two pairs of prongs k, l, one pair of prongs, k, being bent over on one side in the same direction as the lip i while the other pair of prongs, l, are bent in the opposite direction corresponding to the lip j. The studs or trunnions I', I', of the holder are preferably stamped integral with the plate thereof, and these trunnions are disposed in line with the vertical axis of the holder and in a position between the lips i, j, of the holder. These holders are so proportioned that they fit in the carrier E between the track-bars G', G", while the projecting trunnions or studs fit in the slots provided by the track bars and thereby serve to maintain the holders in their proper upright positions and to guide the holders in the movements through the track bars and the carriers as they are successively moved into the eccentric ways, displayed at the front of the cabinet and carried away to make room for the following holders.

By reference to Fig. 10 of the drawings it will be noted that each holder contains two cards which are placed back to back, and with their exposed sides facing in opposite directions; and each card has its two end edges clamped in the holder by the central lips and by the end prongs, whereby the card is clamped both at its center and at its side edges to prevent the card from slipping and maintain it at all times in proper position within the holder. At the same time, the lips and prongs can be readily bent to enable a card to be detached and replaced by another. The holders are placed in parallel positions within the carrier, at right angles to the slotted track-bars thereof, see Fig. 2, and they rest upon the lower track bars, on which they are free to move or slide, while their trunnions serve to maintain the holders in their proper upright positions.

It is designed that the cabinet shall be tilted somewhat when in use, as in Fig. 1, in which the front end is higher than the rear end of the cabinet, and the holders are thus caused to move, slide or gravitate toward the rear lower side of the cabinet. This enables me to utilize the pressure or weight of the series of holders to cause the innermost holder to properly enter the eccentric ways or paths at the entrances thereto which, as before stated, are at the rear side of the cabinet. As the carrier is revolved, the pressure or weight of the holders and their contents causes the innermost holder to enter the eccentric ways by reason of the trunnions slipping therein, and as the trunnions remain in the slotted track bars and the carrier is revolved, the holder continues to move with the carrier, with the trunnions of the holder in the eccentric ways and in the slotted bars G', G'' of the carrier until said bars and the holder reach the open spaces c, d, at the front side of the plates C, D, and the cabinet, whereupon the holder is freed from the carrier because the short ends of the track-bars G', G'' will leave the trunnions and because the holder now is at the point where the eccentric ways are farthest away from the center or axis of the carrier. It will now be seen that the holder is in a position in rear of the door frame and that one card or side thereof can be viewed through the viewing opening in the case A when the doors thereto are opened, thus displaying one card of the holder. In operation, the holder first displayed remains in this position until the carrier is turned to bring the other ends of the track bars opposite to the trunnions of the holder, that is, the longer projected ends g', g', which strike the trunnions and cause the holder to again enter the carrier in rear of the whole series of holders; but when these extended ends strike the trunnions, the holder is reversed so that the unobserved side will face toward the rear of the cabinet. The other holders are in turn brought to the front of the cabinet and displayed, each holder showing one card thereof and being in like manner reversed or turned half way around when conveyed away from the viewing opening, until the holder first displayed is again reached, whereupon it is again carried to the front of the cabinet and its second card displayed, this operation being continued with each of the holders until each displays its second card or the one which was previously concealed.

At the entrance to each track or way provided by the plates C, D, and the strips F, G, are provided the detents J, K, which serve to close the entrances to said eccentric ways to prevent the entrance of the holder-trunnions therein until the proper time and to be actuated to expose said entrances to the ways when the proper holder is brought by the carrier into position to enter the eccentric ways. It will be noted that the upper detent J is arranged above the plate C and it normally drops over the entrance to the upper way to close the same and prevent the upper trunnion on each holder from entering the way or track, hence the carrier-track-bar G' must be constructed so its extension or projection g will lift the detent when the holder should enter the upper way or track. On the other hand, the lower detent K is hung below the lower plate D and thus exposes the end of the way or track, hence the projection or extension g on the lower track-bar G'' is constructed to lift the lower detent when it is desired that the lower trunnion on the holder should not enter the track or way in the lower plate D. It will thus be seen that the detents are positively actuated alternately, the upper one by the track-bar G' when the photograph or card holder should enter the upper way, and the lower one when it is desired to prevent the lower trunnion from entering the lower eccentric track or way.

Each detent is simple in construction, being made, in the embodiment shown by the drawings, of a single piece of wire bent to form the straight arm m, the short curved arm n, and the lower curved lifting arm o. The straight arm m serves as the pivot by which the detent is hung in the cabinet in proper position for its short detaining arm n to lie across and close the entrance to the eccentric way or track, while the longer lifting arm is so arranged that it lies in the path of the projection on the track-bar so that when the extension or projection comes opposite to the lifting arm of the detent, the latter will be turned or rocked to bring the short arm n across the entrance to the way or track and thereby deflect the trunnions of the holders to prevent the same from entering the eccentric ways, as will be understood.

The door frame B has a plate M in which is provided the viewing opening M', and this opening is concealed while the operation of changing the holders takes place, by means of the doors N, N, which are hung on the rock shafts N', N', that have suitable bearings on the door frame. At the upper ends, these shafts are extended above the doors and provided with the pulleys or rollers n', n', which are connected by a crossed belt O that serves to simultaneously actuate both shafts in the same direction and thereby the doors may be opened and closed together. To this crossed belt is connected one end of an operating lever P which is fulcrumed at the top of the case between the cover and the upper plate C, and the heel of this lever is provided with two cams, p, p', disposed at one side of each other and both lying in the path of an arm or stud P' on the upper trunnion of the revoluble carrier. As the carrier is revolved to bring one holder to view, the arm P' strikes the cam p on the lever and actuates the rock shaft to open the doors and expose the contents of the carrier; but as the latter continues to revolve and to carry away the holder, the arm strikes the other cam p' and closes the doors while the operation of changing the holders takes place.

As the holders simply rest in the spaces c, d, at the front of the plates C, D, and are maintained by their trunnions between said plates and the door-frame, they are liable to tilt forward and their contents may become defaced by contact with the door-frame. To obviate this objection, I have provided the yielding arresting device which consists of the cord, tape or ribbon Q passed through the eyes or guides q on the inner side of the door-frame and having an elastic portion, Q', which enables the cord or tape to yield when a holder presses against the same and at the same time maintains the cord or tape under sufficient tension to prevent the holder from pressing too far against the door-frame.

The operation of my cabinet may be briefly summarized as follows: The doors of the cabinet are closed when the operator turns the crank to rotate the carrier. The holders being pressed toward the rear of the cabinet, the upper-track bar G' lifts the upper detent and the trunnions on the rear holder pass into the eccentric ways, after which the detent is released. As the carrier rotates, the holder whose trunnions are in the ways, continues to be carried around until the track-bars reach the open spaces c, d, and at this time the doors are opened by the arm P' striking the lever to actuate the rock shafts. The holder being thus exposed, the carrier may be allowed to remain at rest any desired length of time, but when the carrier is again turned, the doors are closed. As the carrier completes half a turn, the lower track bar G'' lifts the lower detent to close the entrance to the eccentric way at the bottom, the upper one being already closed by the weight of the upper detent, and the other ends of the track-bars, at the same time carry the first holder away from the viewing opening and cause it to enter the track-bars at the front of all the series of holders.

It will be understood that when a holder is left at the front side of the cabinet, one side or object thereof is displayed or exposed to view. When the carrier completes its revolution, the holder is caused to enter the slotted track-bars so that its second side or object faces toward the series of holders already contained in the revoluble carrier. Now, after all of the holders have been once displayed the holder which was first displayed is again carried to the front of the cabinet and as its second or unexposed side faced toward the rear of the cabinet when it previously entered the track-bars, and as said holder is given a half turn with the carrier when conveyed to the front, as stated, the second or unexposed side of the holder will be exposed to view when the holder is momentarily deposited at the front of the cabinet. As the carrier completes its revolution, the upper detent is again lifted and a second holder introduced in the eccentric ways, displayed, and in like manner reversed and carried away at the front of the series of holders, and in like manner each of the holders is brought to the front until they have all been once displayed to show one of the cards thereon. By this time, each of the holders will have been reversed, and as the carrier continues to be revolved the holders will in turn present their previously-unseen cards to view.

It is evident that ready access can be had to the cabinet for the purposes of inspection, repair or adjustment and that the contents of the holders can be changed in a short time as the door frame is removable and the holders can be readily slipped out of the carrier.

I am aware that changes in the form and proportion of parts and in the details of construction can be made without departing from the spirit or sacrificing the advantages of my invention, and I therefore reserve the right to make such changes and alterations as fairly fall within the scope of my invention.

In Fig. 11 of the drawings I have shown a modified construction of one end of the revoluble carrier, that is to say, the end of the carrier is formed with a trough-like receptacle S having a longitudinal slot S' in one part thereof for the accommodation of the trunnions on the holders.

What I claim as new, and desire to secure by Letters Patent, is—

1. The combination with a casing having the eccentric ways, a revoluble carrier having the track-bars, and a series of holders each constructed to carry two objects for display and fitted with their ends between said track-bars in said carrier, substantially as described, for the purpose set forth.

2. In a cabinet of the class described, the holder I provided with the trunnions and with clamping devices on each side and end thereof, combined with a cabinet having a revoluble carrier, said carrier having the diametrically arranged track-bars in which the holders fit and the ways or paths arranged eccentric to the circle described by the carrier in its rotations, substantially as described.

3. In a cabinet of the class described, the holder I having the central lips on each side and at each end and the corresponding prongs on opposite sides of the central lips and near to the edges of said holder, combined with a carrier, the plates in which the carrier operates, and the eccentric ways to receive the trunnions on the holders, substantially as described.

4. The combination with a cabinet having the eccentric ways, of a revoluble carrier, a holder or holders having projections fitted in the carrier and adapted to the ways, and automatic detents to normally close the entrances to said ways and arranged to be operated by the carrier to permit a holder to pass into said ways, substantially as described.

5. The combination with a cabinet having eccentric ways, of a carrier, one or more holders, and automatic detents to close the entrances to said ways, one of the detents serving to normally close one of the ways and the other detent being operated by the carrier to close the other way, substantially as described.

6. The combination with a cabinet having the eccentric ways, and a revoluble carrier operating within said ways, of the series of holders provided with studs fitted in the carrier and adapted to pass one after the other into said eccentric ways, and two detents one pivoted above the upper way and normally closing one end thereto and the other hung below the lower way and having an arm in the path of the carrier whereby it may be lifted to close the entrance to the lower eccentric way, substantially as described.

7. The combination with a cabinet having the top and bottom plates and the eccentric ways, a revoluble carrier hung within the plates and having the slotted track-bars G', G'' each provided with the projections, a series of holders having trunnions fitted in the slotted track-bars and adapted to pass, one after the other on the rotations of the carrier, into the eccentric ways, and two detents hung at the entrances to the eccentric ways and each provided with a detaining arm and with a lifting arm that lies in the path of the projections on the track-bars, substantially as and for the purpose described.

8. In a cabinet of the class described, the revoluble carrier consisting of the upright open frame and the track-bars rigid with the frame at the top and bottom thereof and provided with the longitudinal slots, combined with the top and bottom plates having openings in which is fitted the carrier, the eccentric ways, and the series of holders having lugs fitted in the slotted track-bars, for the purpose described, substantially as set forth.

9. The combination with a casing and a revoluble carrier therein, of the doors hung on rock-shafts connected for simultaneous operation, a lever provided with cams at one end and with its other end connected with the means for operating the door-shafts, and an operating arm on the carrier adapted to strike the cams on the door-operating lever, substantially as described.

10. The combination with a cabinet and a revoluble carrier substantially such as described, of the front having the viewing opening and a door, a holder, and a yielding arresting mechanism on the inside of the front, said arresting mechanism consisting of a tape, cord or ribbon loosely supported and having an intermediate elastic or yielding section, substantially as described.

In testimony whereof I affix my signature in presence of two witnesses.

BENJAMIN J. SMITH.

Witnesses:
JAMES A. MEDLAR,
FRANK R. WARD.